(12) United States Patent
Batterman et al.

(10) Patent No.: US 7,089,151 B2
(45) Date of Patent: Aug. 8, 2006

(54) METHOD AND SYSTEM FOR DETERMINING OCCURRENCE OF SLIPS LEADING TO FALLS

(75) Inventors: Scott D. Batterman, Cherry Hill, NJ (US); Steven C. Batterman, Cherry Hill, NJ (US)

(73) Assignee: Batterman Engineering, LLC., Cherry Hill, NJ (US)

( * ) Notice: Subject to any disclaimer, the term of this patent is extended or adjusted under 35 U.S.C. 154(b) by 0 days.

(21) Appl. No.: 10/818,921

(22) Filed: Apr. 6, 2004

(65) Prior Publication Data
US 2005/0222807 A1    Oct. 6, 2005

(51) Int. Cl.
*G06F 17/18* (2006.01)
(52) U.S. Cl. .................................................. 702/181
(58) Field of Classification Search ................ 702/142, 702/147, 149, 158, 179–181, 189, 160; 703/6, 703/22; 73/9, 10
See application file for complete search history.

(56) References Cited

U.S. PATENT DOCUMENTS

| 6,611,789 B1 * | 8/2003 | Darley ........................ 702/160 |
| 6,876,947 B1 * | 4/2005 | Darley et al. ................ 702/160 |

FOREIGN PATENT DOCUMENTS

WO    2005/103943    * 11/2005

OTHER PUBLICATIONS

Barnett, R.L., "Slip and Fall" Theory- Extreme Order Statistics, International Journal of Occupational Safety and Ergonomics (JOSE), 2002, vol. 8 No. 2, 135-138.

Batterman S. et al, A Proposed Mathematical Model For The Prediction Of Macroslip Under Both Wet And Dry Conditions, C7, p. 79, American Academy of Forensic Sciences, Copyright 1999.

Brady, R.A., et al, Foot Displacement But Not Velocity Predicts The Outcome Of A Slip Induced In Young Subjects While Walking, Journal of Biomechanics, 33 (2000) 803-808.

Buczek, F.L., et al, High-resolution Force Plate Analysis of Utilized Slip Resistance in Human Walking, Journal of Testing and Evaluation, JTEVA, vol. 24, No. 6, 1996, pp. 353-358.

(Continued)

*Primary Examiner*—Michael Nghiem
(74) *Attorney, Agent, or Firm*—Fleit Kain Gibbons Gutman Bongini & Bianco; Paul D. Bianco; Martin Fleit

(57) ABSTRACT

The present invention provides a system and method for the prediction of macroslip on walkway surfaces. The slip prediction is based on a viscous shear model and incorporates anthropometric characteristics of an individual or substantially similar grouping of individuals as well as properties of the walkway surface. In the shear model, the prediction of slip is a function of walking speed, stride length and other anthropometric factors which affect gait, as well as the friction (shear) forces that develop at the shoe-floor interface. Mathematical relationships are developed relating the forward walking speeds to the stride lengths necessary for the onset of macroslip. Curves are then plotted which enable the prediction of macroslip for various footwear and walkway surface combinations under both wet and dry conditions.

17 Claims, 9 Drawing Sheets

OTHER PUBLICATIONS

Cham, R., et al, Heel Contact Dynamics during Slip Events on Level and Inclined Surfaces, Safety Science, 40 (2002) 559-576.

Cham, R., et al, Lower Extremity Corrective Reactions to Slip Events, Journal of Biomechanics, 34 (2001) 1439-1445.

Englander, F., et al, Economic Dimensions of Slip and Fall Injuries, Journal of Forensic Science 1996, 41(5), 733-746.

Fendley, A.E., et al, Required Coefficient of Friction Versus Top-Piece/Outsole Hardness And Walking Speed: Significance of Correlations, Journal of Forensic Science, 1996; 41(5) 763-769.

Fuller, D.D., Theory and Practice of Lubrication for Engineers, Second Edition, A Wiley-Interscience Publication, pp. 202-205, 1984.

Hickman, R. S., Analysis of Slipping on Wet Surfaces, Journal of the National Academy of Forensic Engineers, vol. V, No. 2, 57-64, 1988.

Marpet, M.I., On Threshold Values that Separate Pedestrian Walkways that are Slip Resistant From Those That Are Not, Journal of Forensic Science 1996; 41(5): 747-755.

Marpet, M.I., Walkway Safety: An Overview, Journal of Forensic Science 1996: 41(5): 731-732.

Marpet, M.I, et al, The Effect of Contact Pressure and Test-Foot Sliding on Slip Resistance: Experimental Results, Journal of Forensic Science 1996; 41(5): 770-775.

Marpet, M.I., et al, Suggested Use of Ratiometric Analysis, Dimensionless Numbers, and Subjective Scoring for the Development of a Slip-Prediction Model, Thirteen Southern Biomedical Engineering Conference, Apr. 16-17, 1994, University of the District of Columbia, Washington, D.C.

Marpet, M.I, et al, Metrology of Pedestrian Locomotion and Slip Resistance, ASTM International, pp. 67-72, Dec. 2002.

Medoff, H.P., Viscoelastic Characteristics of Typical Shoe Outsole Material And Their Effects On Walkway Friction Models., Journal of Forensic Science, 1996; 41(5): 756-762.

Powers, C.M., et al, Utilized Coefficient of Friction During Walking; Static Estimates Exceed Measured Values, Journal of Forensic Science 47(6): 1303-1308, Nov. 2002.

Proctor, T.D., et al, Slipping, Tripping and Falling Accidents in Great Britain—Present and Future, Journal of Occupational Accidents 9, (1988) 269-285.

Redfern, M. et al, Biomechanics of Slips, Ergonomics, 2001, vol. 44, No. 13, 1138-1166.

Sacher, A., The application of Forensic Biomechanics To The Resolution Of Unwitnessed Falling Accidents, Journal of Forensic Science 1996; 41(5): 776-781.

Sherman, R.M., Preventing Slips that Result in Falls, American Society of Safety Engineers, Mar. 1992.

W. F. Hughes et al, Theory and Problems of Fluid Dynamics, Schaum's Outline Series, Chapter 12, McGraw-Hill Book Company, pp. 230-231, 1999.

* cited by examiner

METHOD AND SYSTEM FOR DETERMINING OCCURRENCE OF SLIPS LEADING TO FALLS

FIELD OF THE INVENTION

The present invention provides systems and methods for determining the occurrence of slips leading to falls. In particular, the systems and methods can be utilized to predict macroslip on dry or wet walkway surfaces. As used herein, a macroslip is defined to be a slip large enough to be perceptible to the walker with an associated potential for a loss of balance.

BACKGROUND OF THE INVENTION

Traumatic injuries and deaths resulting from slip and fall accidents are a significant public health problem in the United States. The economic loss due to lost employment time is an important factor in many industrial settings and the likelihood of injuries resulting from slip and fall accidents is an increasing concern in general, particularly as the population ages. Numerous measures have been undertaken in an attempt to reduce the number of slip and fall accidents including, but not limited to, the use of slip resistant materials on walkway surfaces and prescribed shoe outsole materials and patterns. Various factors known to influence the likelihood of a macroslip have been quantified/ranked by numerous investigators.

The classical notion of Coulomb friction has traditionally been applied to the analysis of slip and fall accidents in an oversimplified manner despite its known and acknowledged shortcomings. For hard, rigid material surfaces in contact, Coulomb demonstrated that the magnitude of the friction force, F, acting on the contact surfaces in opposition to relative motion between the surfaces is proportional to the magnitude of the normal force, N. However, the constant of proportionality, $\mu$, differs with the state of motion. As is well-known by those of ordinary skill, $\mu$ can be viewed as the coefficient of friction or as a slip resistance measurement, a parameter that can be measured with, for example, a tribometer. For impending slip just at, or immediately prior to, relative motion between the surfaces, the magnitude of the friction force, $F = \mu_s N$, and for contact surfaces in relative motion, the magnitude of the friction force, $F = \mu_k N$, where $\mu_s$ is the coefficient of static friction and $\mu_k$ is the coefficient of kinetic (dynamic) friction. Typically, $\mu_s$ is higher than $\mu_k$. In addition, $\mu_s$ and $\mu_k$ are dependent upon both materials in contact.

In Coulomb friction theory, the friction force is independent of both the contact area and the relative speed of the materials in contact once relative motion of the surfaces has commenced. For compliant (deformable) materials in contact, such as shoe outsole and flooring materials, these are simplifying assumptions which may not lead to an appropriate model in many circumstances. The onset of slip is a function of many factors, and the probability of a slip occurring cannot typically be based on a single quantity, or parameter, such as the coefficient of friction alone. For instance, several individuals can walk across the same surface, wearing substantially similar footwear, and some may slip while others negotiate the walkway with no trouble.

Therefore, a need exists for an improved system and method for determining macroslip.

SUMMARY OF THE INVENTION

The present invention provides a system and method for the prediction of macroslip on walkway surfaces. The slip prediction is based on both an individual's characteristics and properties of the walkway surface and includes a viscous, or velocity dependent, shear model. In the shear model, the prediction of slip is a function of walking speed, stride length and other anthropometric factors which effect gait and the friction (shear) force that develops at the shoe-floor interface.

On wet surfaces, a thin continuous hydrodynamic film layer is modeled to exist between the shoe outsole and the walkway surface. The onset of macroslip is a function of the speed of the foot at first contact, stride length, depth of the fluid film, walkway surface texture and the viscosity of the fluid contaminant.

The method for determining the occurrence of macroslip on a walkway surface is based on a viscous (velocity dependent) shear model utilizing friction properties of the walkway and shoe outsole, the viscosity of the fluid contaminant (if one is present) and an anthropometric gait index, newly defined herein. Curves can then be generated for a specific individual, or substantially similar grouping of individuals, defining the combinations of walking speed and stride length likely to lead to a macroslip.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 11 is a block diagram of a computer system useful for implementing the present invention.

DETAILED DESCRIPTION OF THE INVENTION

The present invention provides a system and method for the prediction of macroslip on walkway surfaces. Specifically, the present invention is utilized for the prediction of macroslip on both wet and dry walkway surfaces.

Figure 1:
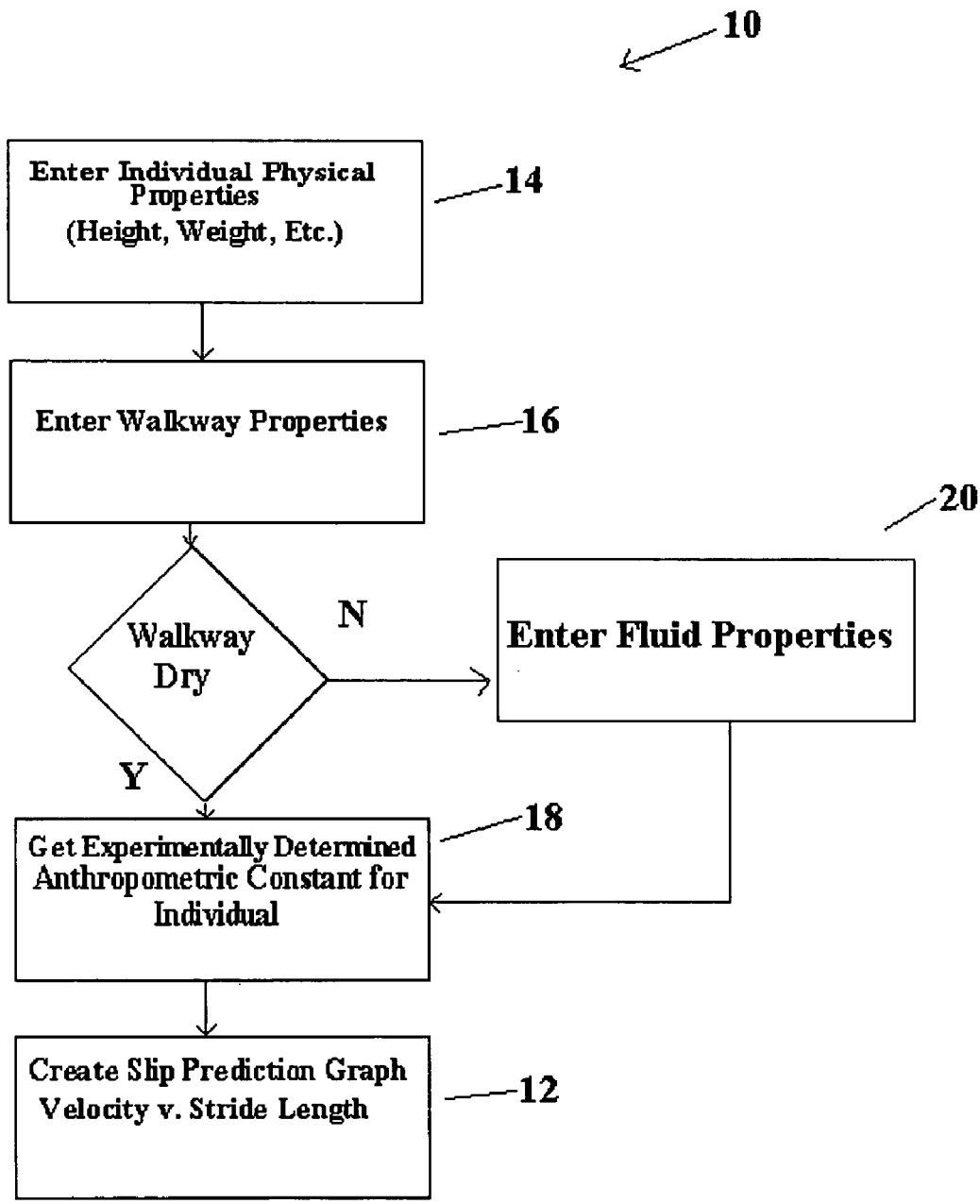
FIG. 1 a flow chart of the method of the present invention.

Referring now to the drawing figures in which like reference designators refer to like elements, there is shown in FIG. 1 a flow chart of the method of the present invention. The method 10 provides a slip prediction 12 based on an individual's characteristics 14 and properties of the walkway surface 16. The method is based on a viscous, or velocity dependent, shear model in which the prediction of macroslip is a function of walking speed, stride length 14 and other anthropometric factors 18 which effect gait and the friction (shear) force that develops at the shoe-floor interface. On wet surfaces a thin continuous hydrodynamic film layer is modeled to exist between the shoe outsole and the walkway surface, wherein the onset of macroslip is a function of the speed of the foot at first contact, stride length, depth of the fluid film, walkway surface texture and the viscosity of the fluid contaminant 20. Note also, that a subroutine can be included to compute the anthropometric constants (AGI's, i.e. $C_{di}$ and $C_{wi}$) for a given set of test results, either for an individual or for a statistically significant grouping of individuals. The subroutine can be written to compute the AGI for each test and to further compute the statistically significant AGI for each set of tests, i.e. each grouping of individuals.

Dry Surface

The slip criterion follows from a simple dimensional analysis utilizing variables known to influence the onset of slip. The parameters are combined in a manner to give units of force. The notion of Coulomb friction is utilized to derive a threshold force value defining the onset of macroslip. Initially, slip at heel strike is considered and the method is then extended to include slip at push-off.

During a normal gait cycle, immediately following heel strike, the foot (shoe) is decelerated to a zero forward velocity as it continues to roll down into complete ground contact (stance) and the push-off phase of the gait cycle. However, if sufficient friction force at the interface cannot be developed to decelerate the heel to a zero forward velocity, then a heel slip occurs. Therefore, when modeling slip at heel strike the relevant friction force is defined in terms of the coefficient of kinetic (dynamic) friction ($\mu_k$). When modeling slip at push-off, the foot (shoe) in contact with the ground accelerates from a zero velocity. Therefore, for slip at push-off the threshold friction force, defined by the coefficient of static friction ($\mu_s$), must be overcome for slip to occur. The utility of the model is independent of testing method as long as the relevant coefficient of friction, or slip resistance measure, and anthropometric parameters are consistently defined throughout.

Assuming that slip is a function of the mass of an individual, the horizontal walking speed at the center of mass and the stride length, then from a dimensional analysis, or simply by inspection, for the onset of slip on a hard, flat, dry, level surface the proposed criterion takes the form:

$$F_\tau = \frac{C_{di} M V^2}{L} \quad (1)$$

where the terms in equation (1) are defined as follows:

$F_\tau$—Threshold friction force defining the onset of macroslip;

$C_{di}$—Experimentally determined dimensionless anthropometric constant, or anthropometric gait index (AGI), discussed below in further detail.

i=k for slip at heel strike, and i=s for slip at push off;

M—Mass of the individual;

V—Forward (horizontal) walking speed at the center of mass of the individual; and L—Stride length.

As long as the maximum friction force generated at the shoe-floor interface, defined by the right side of equation (1), is below the threshold value ($F_\tau$), a macroslip is not likely to occur. Slip is predicted to occur when the right side of equation (1) is greater than or equal to the threshold friction force, $F_\tau$. Initially, the magnitude of the threshold force value is defined in terms of the traditional notion of Coulomb friction, such that:

$$F_\tau = \mu_i N, \quad (2)$$

where $\mu_i$ is the relevant coefficient of friction, and N is the magnitude of the normal force. It is noted that walking is a dynamic process with a time varying normal force during the gait cycle. However, for simplicity, the normal force, N, can be taken to be the weight, W, of the individual. Due to the observed variability of $\mu_i$ with testing method, a standardized procedure should be rigorously prescribed and adhered to, in order to ensure consistency between all of the measured and derived parameters. Use of the model is independent of testing method as long as the slip resistance measure, taken as $\mu_i$, and the AGI ($C_{di}$) are consistently defined. Substituting (2) into (1) we find that the onset of slip occurs when:

$$\mu_i = \frac{C_{di}V^2}{gL}, \tag{3}$$

where g is the acceleration due to gravity. Slip, therefore, is predicted to occur when $$\frac{C_{di}V^2}{gL} \geq \mu_i \tag{3a}$$

The constant $C_{di}$ can be determined experimentally, and is a function of anthropometric factors effecting gait including, but not necessarily limited to age, gender, height, weight, specific gait peculiarities, etc. $C_{di}$ is determined experimentally for the appropriate anthropometric groupings. Alternatively, once enough data is gathered for different anthropometric groupings across the population, devices can be developed to actually measure these AGI parameters (in this case, $C_{di}$, and, as described below, $C_{wi}$).

To determine $C_{di}$, test subjects are grouped according to age, height, weight, and gender. Gait anomalies are noted. In an exemplary embodiment, all subjects are outfitted with the same footwear in each trial. In addition, test subjects can be provided with a safety harness or other means to prevent injury when a slip does occur. Testing is performed by having each subject walk across a walkway test surface with a known (pre-measured) coefficient of friction, or slip resistance, between the walkway surface and shoe outsole material. Walking speeds will be controlled, and stride lengths will be measured. Equation (3) is rearranged so that $C_{di}$ can be directly calculated at the onset of macroslip.

$$C_{di} = \frac{\mu_i gL}{V^2} \tag{4}$$

The data is then reduced to determine a statistically representative $C_{di}$ for each individual and/or anthropometric grouping.

ILLUSTRATIVE EXAMPLES

To illustrate the use of the model of the present invention an exemplar male who slipped at heel strike on a given walkway surface under the following conditions is considered. It is noted that, although realistic, these numbers were chosen purely for illustrative purposes.
stride length: 2.5 ft.
walking speed at which macroslip occurs: 4.4 ft/s (3 mph).
coefficient of kinetic friction ($\mu_k$): 0.50.

By direct substitution into equation (4), $C_{dk}$=2.08. Equation (3) is applied to yield a direct relationship between walking speed and stride length to define the slip criterion. Substituting the calculated value for $C_{dk}$ into equation (3), or (4), in conjunction with the other specified parameters and rearranging yields:

$$V=\sqrt{(7.74L)}, \tag{5}$$

which defines the slip criterion for the subject exemplar individual, i.e. the combinations of walking speed and stride length likely to lead to macroslip. Note that the graph also defines those combinations of walking speed and stride length which allow the individual to safely negotiate the walkway surface.

Figure 2:
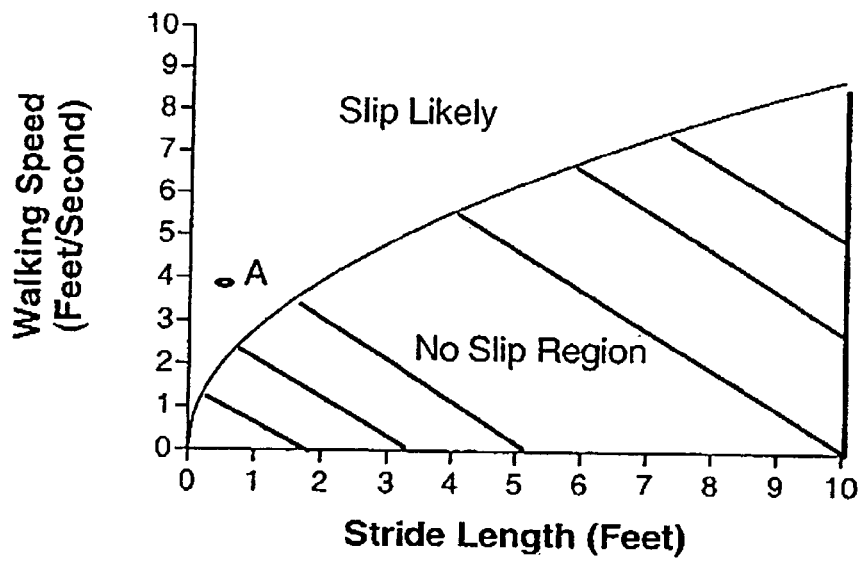
FIG. 2 is a plot of the walking speed vs. stride length curve for an exemplar 165 pound individual walking on a dry ($\mu_k = 0.5$) surface. For the purpose of generating this curve and calculating the anthropometric gait index, $C_{dk}$, it was assumed that slip was experimentally observed to occur at a walking speed of 4.4 feet/second, with a corresponding stride length of 2.5 feet.

Equation (5) is plotted in FIG. 2 and divides V-L space into two regions. Slip is predicted to occur for points on or above the subject curve, and is not predicted to occur for points below the curve in the cross-hatched region. The figure indicates that for a given stride length, a range of walking speeds can be accommodated prior to reaching the critical speed at which macroslip occurs. Or, for a fixed walking speed (measured at the center of mass), a certain range of stride lengths can be accommodated prior to the occurrence of a macroslip.

To illustrate, consider the point A in FIG. 2. For the walking speed $V_A$, the subject individual is in the region of the curve where macroslip is likely at shorter stride lengths. This is due to the fact that in order to maintain a given walking speed at shorter stride lengths, more steps are necessary, foot speeds increase and higher friction forces are required at the shoe-floor interface to prevent slip. Therefore, the probability of macroslip increases for a fixed walking speed as stride length decreases.

It is noted, however, that due to anthropometric limitations, gait will also become unstable as stride length and walking speed increase to, and beyond, individual (anthropometric grouping) physical limits. For example, a shorter individual cannot be expected to maintain stability in gait over the same range of stride lengths as a taller one. Furthermore, stride lengths beyond a certain value will not even be attainable. Consequently, there will be a critical stride length beyond which the proposed criterion is no longer predictive of actual physical phenomena for an individual or anthropometric grouping.

Figure 3:
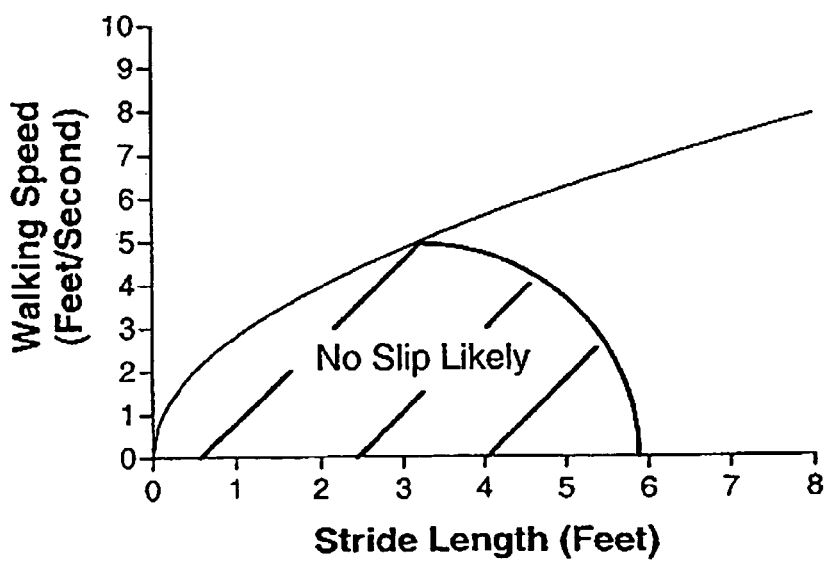
FIG. 3 shows a graph of slip as a function of walking speed and stride length with stride length limitations.

At this critical point the slope of the tangent to the curve would reverse, and the expected behavior is qualitatively illustrated by the lower branched bounding curve in FIG. 3. The current form of the criterion is only meant to model the onset of macroslip under commonly observed ranges of stride lengths and walking speeds as defined by the testing used to define $C_{di}$.

Figure 4:
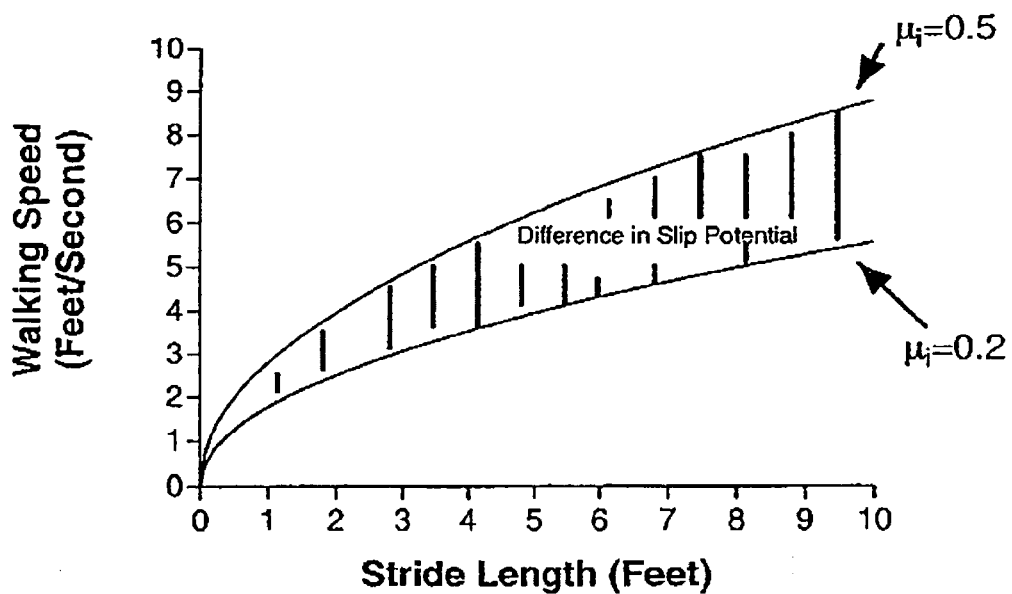
FIG. 4 shows a graph showing the difference in slip potential for the same individual on two different walkway surfaces.

To further illustrate the applicability of the model of the present invention, FIG. 4 compares the slip potential of the aforementioned exemplar individual on two different walkway surfaces (i.e. same $C_{di}$, different $\mu_i$'s). The difference in slip potential is shown by the cross hatched area. The model predicts the intuitively obvious notion that higher walking speeds can be achieved on a higher coefficient of friction surface prior to the onset of macroslip. However, with the model of the present invention the difference in slip potential between different walkway surfaces is more appropriately quantified beyond a simple comparison of the coefficients of friction ($\mu_i$'s).

Figure 5:
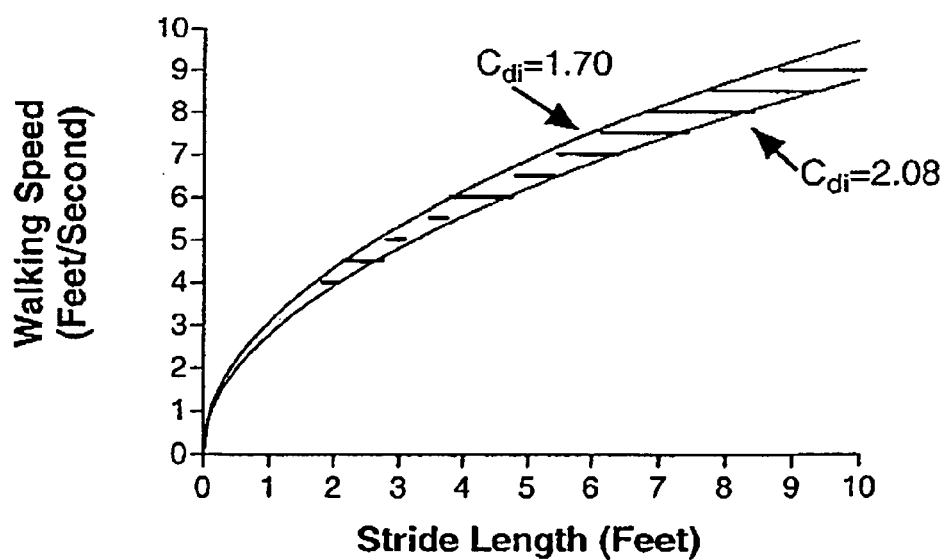
FIG. 5 is a graph showing the difference in slip potential for two different individuals on the same walkway surface, or for the same individual in two different sets of footwear on the same walkway surface.

In FIG. 5, a comparison is made between the slip potential for two different anthropometric groupings on the same walkway surface (i.e. same $\mu_i$, different $C_{di}$'s). The difference in slip potential between the two anthropometric groupings is again denoted by the cross-hatched area. It is again noted that the anthropometric constants ($C_{di}$) were chosen for illustrative purposes only, and are not meant to imply that they are the results of any testing performed to date. For the case of slip on a dry walkway surface, the model of the present invention can be used to predict the occurrence of slip at either heel strike or push-off.

*Preventing Slips That Result In Falls*, American Society Of Safety Engineers, March 1992 by R M Sherman ("Sherman") presents the results of testing where walking speed, stride length, and other geometric gait parameters were measured for two individuals, one male and one female during walking. Utilizing a very simplified geometric model, Sherman computed the minimum coefficient of dynamic friction ($\mu_k$) required to prevent slip. We make no claims as to the validity and accuracy of the Sherman model, or results and testing method, and utilize Sherman's results for demonstrative purposes only. Sherman presents results for a 6'3" male with a 39" leg length, and a 5'10" tall female with a 37" leg length. The weights of the individuals are not presented.

Figure 6A:
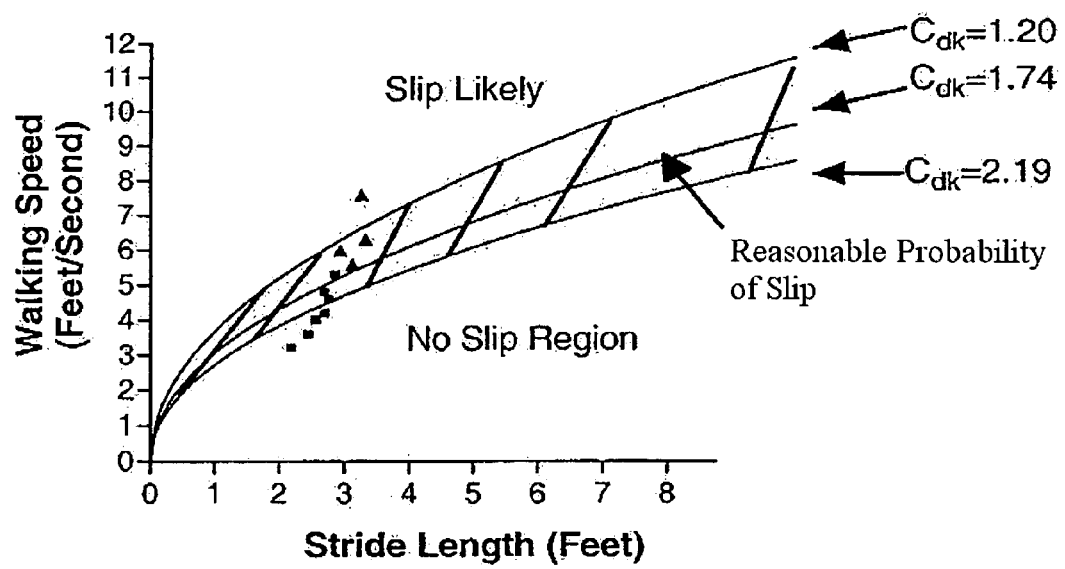
FIG. 6a shows a graph for predicting the onset of slip utilizing the Sherman data for a $\mu_k = 0.50$ dry walkway surface. The curves have been generated based on the $C_{dk}$ (Anthropometric Gait Index, AGI) for each of the three ranges of walking speeds per the Sherman data. The triangular points correspond to tests where Sherman predicts that the minimum $\mu$ required to prevent slip is 0.5 or greater, i.e., high probability of slip on a $\mu = 0.5$ surface. The square points correspond to tests where Sherman predicts that the minimum value of $\mu$ required to prevent slip is below 0.5, i.e., slip is not likely to occur on a $\mu = 0.5$ surface. Note that the system and method according to the present invention correlates well with the Sherman data.

For the analysis to follow, $C_{dk}$ was calculated for each test presented. The results of the Sherman tests and the computed $C_{dk}$ (utilizing equation 4) for the 6'3" male subject are presented in Table I.

material with $\mu_k$=0.5, three curves are plotted in FIG. 6a, one for each value of $C_{dk}$ computed for each range of walking speeds. Each curve can then be used to define a region in V-L space indicating varying probabilities of the occurrence, or onset, of a macroslip.

Another approach is to calculate a statistically representative $C_{dk}$ (the average, for example) to be taken as constant over the entire range of walking speeds. For the data presented in Table I, $C_{dk(average)}$ is 1.85, and the resulting curve is plotted in FIG. 6b. In FIG. 6c, a composite curve is constructed by using the calculated $C_{dk}$'s for each range in walking speeds.

Figure 6B:
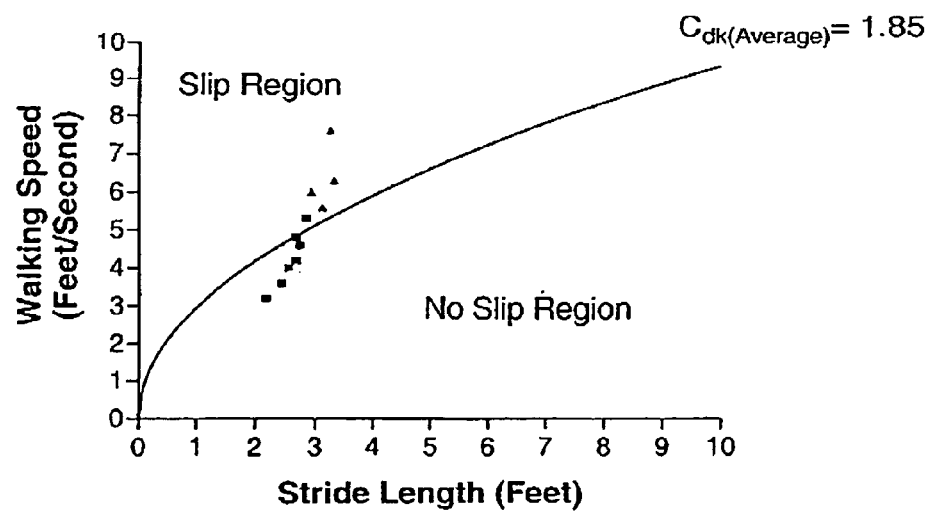
FIG. 6b shows a graph for predicting the onset of slip utilizing the Sherman data for a $\mu_k = 0.50$ dry walkway surface. The single curve was generated utilizing the average $C_{dk}$ (Anthropometric Gait Index, AGI) computed over the entire range of walking speeds for the Sherman data. The triangular points correspond to tests where Sherman predicts that the minimum $\mu$ required to prevent slip is 0.5 or greater, i.e., high probability of slip on a $\mu$=0.5 surface. The square points correspond to tests where Sherman predicts that the minimum value of $\mu$ required to prevent slip is below 0.5, i.e., slip is not likely to occur on a $\mu$=0.5 surface. Note that the system and method according to the present invention correlates well with the Sherman data.
Figure 6C:
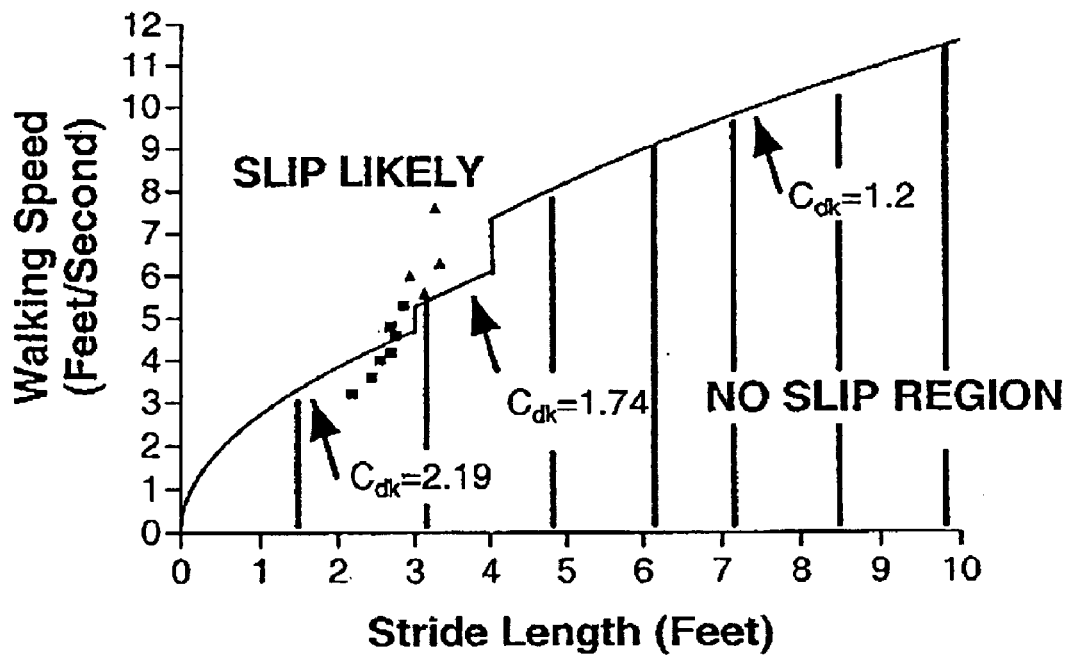
FIG. 6c shows a graph for predicting the onset of slip utilizing the Sherman data for a $\mu_k$=0.50 dry walkway surface. The composite curve is generated utilizing values of the $C_{dk}$ (Anthropometric Gait Index, AGI) computed from each of the three ranges of walking speeds per the Sherman data. The triangular points correspond to tests where Sherman predicts that the minimum $\mu$ required to prevent slip is 0.5 or greater, i.e., high probability of slip on a $\mu$=0.5 surface. The square points correspond to tests where Sherman predicts that the minimum value of $\mu$ required to prevent slip is below 0.5, i.e., slip is not likely to occur on a $\mu$=0.5 surface. Note that the system and method according to the present invention correlates well with the Sherman data.
Figure 6D:
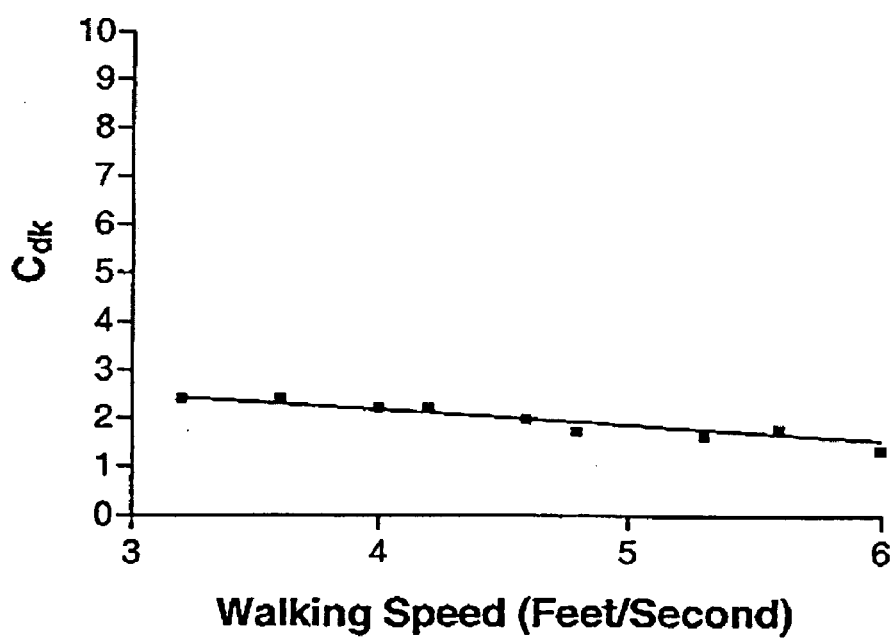
FIG. 6d shows a graph of $C_{dk}$ computed from the Sherman data as a function of walking speed.
Figure 6E:
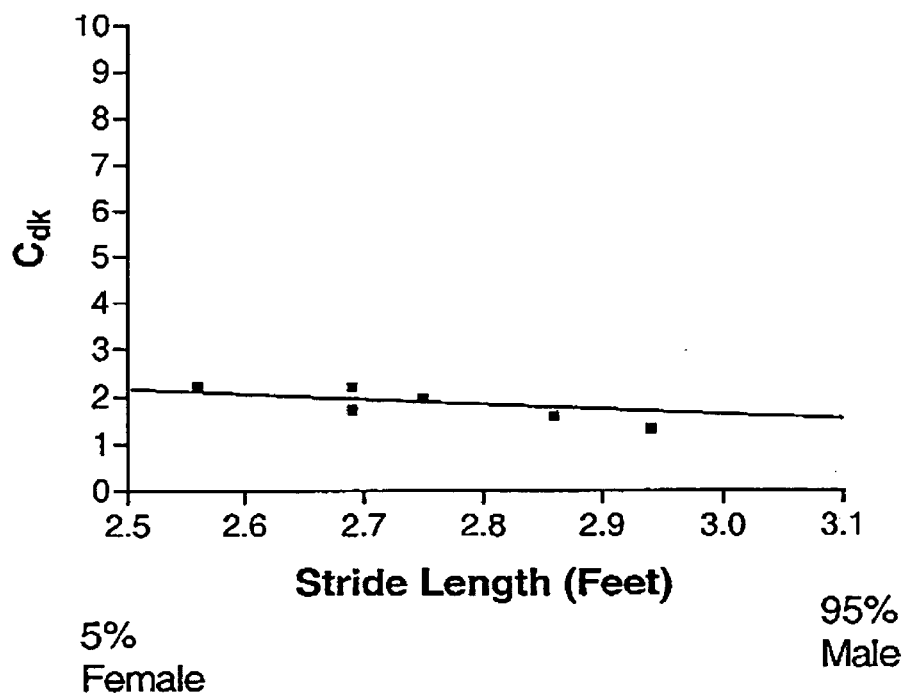
FIG. 6e shows a graph of $C_{dk}$ computed from the Sherman data as a function of stride length.

Note that the Sherman data is also plotted on FIGS. 6a, 6b, and 6c along with the theoretical curves. The solid triangular points represent the results of the Sherman tests where $\mu_k$>0.5 was required to prevent slip (i.e., slip would occur on a $\mu_k$=0.5 surface), and the solid square points represent tests where slip would not occur on a $\mu_k$=0.5 surface. It is noted that the model of the present invention correlates well with the Sherman data. FIGS. 6d and 6e are plots of $C_{dk}$ versus walking speed and stride length respectively utilizing the Sherman data. As shown in the figures, $C_{dk}$ is approximately constant over the range of walking

TABLE 1

|  | no. steps | seconds leg length 39" | mph 50' walk | fps | step" | ½ step" male | angle° | min cof to prevent slips | $C_{dk}$ |
|---|---|---|---|---|---|---|---|---|---|
| v. slow | 23.0 | 15.5 | 2.2 | 3.2 | 26.1 | 13.1 | 19.5 | 0.35 | 2.40 |
| slow | 20.5 | 13.7 | 2.4 | 3.6 | 29.3 | 14.6 | 22.0 | 0.40 | 2.42 |
| reg. | 18.6 | 11.9 | 2.9 | 4.2 | 32.3 | 16.1 | 24.4 | 0.45 | 2.20 |
| brisk | 18.2 | 10.8 | 3.1 | 4.6 | 33.0 | 16.5 | 25.0 | 0.47 | 1.97 |
| fast | 17.5 | 9.4 | 3.6 | 5.3 | 34.3 | 17.1 | 26.0 | 0.49 | 1.61 |
| faster | 17.0 | 8.3 | 4.1 | 6.0 | 35.3 | 17.6 | 26.8 | 0.51 | 1.34 |
| v. fast | 15.3 | 6.6 | 5.2 | 7.6 | 39.2 | 19.5 | 30.2 | 0.58 | 1.06 |
| slow | 19.5 | 12.6 | 2.7 | 4.0 | 30.7 | 15.4 | 23.2 | 0.43 | 2.22 |
| med. | 18.6 | 10.5 | 3.2 | 4.8 | 32.3 | 16.1 | 24.5 | 0.46 | 1.73 |
| brisk | 16.0 | 9.0 | 3.8 | 5.6 | 37.6 | 18.8 | 28.9 | 0.55 | 1.77 |
| fast | 15.0 | 8.0 | 4.3 | 6.3 | 40.0 | 20.0 | 30.9 | 0.60 | 1.62 |

For the purposes of this analysis the $\mu_k$ defined by Sherman as the minimum coefficient of friction necessary to prevent slip is assumed to be approximately equal to the $\mu_k$ at the onset of slip. It is noted that there is little significant variation in $C_{dk}$, particularly in the speed range defined by Sherman to be from very slow to regular. There is some deviation at the higher walking speeds, but this is to be expected due to adjustments in gait when one is hurrying or on the verge of running. Therefore, the Sherman data suggests that $C_{dk}$ can be considered constant, at least over specified ranges in walking speed.

Composite curves can then be constructed to study the slip behavior of an individual (or anthropometric grouping) over an entire range of walking speeds by generating curves with the appropriate $C_{dk}$ over each range of walking speeds. For example, utilizing the Sherman data and the computed $C_{dk}$'s in Table I, consider the three ranges in walking speed defined by Sherman, (i) very slow to regular, (ii) brisk to fast, and (iii) faster to very fast. Based on the data presented in Table I, the average $C_{dk}$ in each range is 2.19, 1.74 and 1.20 respectively.

To characterize the slip behavior there are several reasonable alternatives. For a walking surface and shoe outsole speeds and stride lengths plotted in FIGS. 6d and 6e. However, the slight linear variation is noted.

Wet Model

A thin continuous hydrodynamic film of fluid contaminant is modeled to exist between the shoe outsole and the walkway surface. The mechanics of the shoe-fluid-floor interface is rigorously modeled utilizing prescribed constitutive behaviors in conjunction with the laws of classical mechanics. On a wet surface, the onset of macroslip is considered to be a function of foot speed, stride length, depth of the fluid film, as well as the viscosity of the fluid contaminant and the walkway surface texture. In the absence of a fluid film (contaminant) layer the wet model reduces to the dry model.

Hydrodynamic Film Theory

The fluid layer at the shoe-fluid-floor interface is modeled as a thin hydrodynamic film. In accord with hydrodynamic film theory, the pressure in the film does not vary with depth, and is a function of the horizontal position, x, only. Neglecting inertial forces, the equation of (quasi-static) motion in the contaminant (fluid) film becomes:

$$\frac{dp}{dx} = \frac{\partial \tau}{\partial y} \qquad (6)$$

where p is the pressure in the film and τ is the shear stress.

Constitutive Behavior

Figure 7:
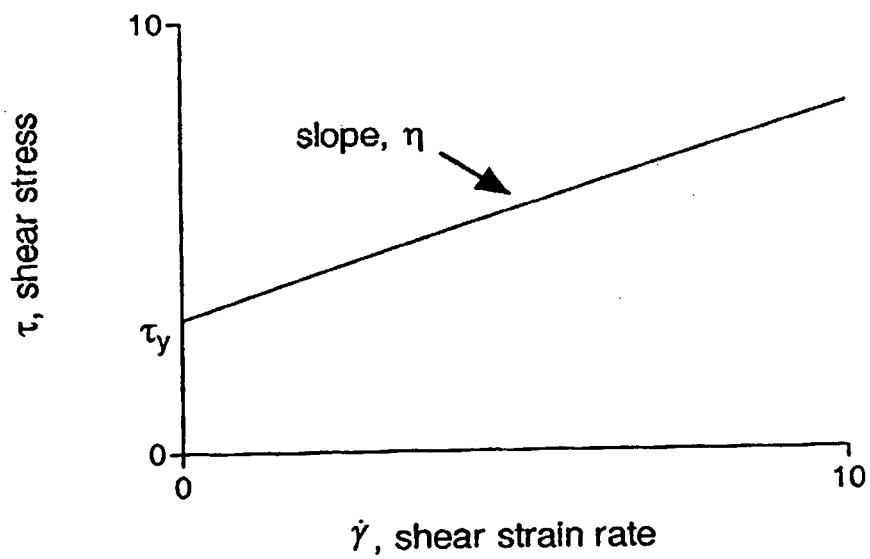
FIG. 7 graphically depicts that the composite shoe-fluid-floor interface is modeled to behave as a Bingham plastic fluid material.

The composite behavior of the interface is modeled as a Bingham Plastic-like fluid, as shown in FIG. 7, and described by the following relationship.

$$\tau = \tau_y + \eta \dot{\gamma} \qquad (7)$$

It is parenthetically noted that this is analogous to a rigid-linear work hardening solid. As shown in the figure, a critical shearing stress ($\tau_y$) must be applied before the fluid contaminant begins to shear. For the purposes of model of the present invention, η is the absolute viscosity of the fluid (slope of the stress-strain rate curve) once shearing commences. $\dot{\gamma}$ is the shear strain rate ($\partial V/\partial y$), or velocity gradient, through the fluid layer.

In the present context, the $\tau_y$ term arises from the interaction between the shoe outsole material and the walkway surface (i.e. shoe outsole and walkway surface textures). Due to the compliance and/or interpenetration of the shoe outsole material and walkway surface, even when wet, a minimum shear stress needs to be applied to commence slip, and shearing in the fluid layer. The value of $\tau_y$ is dependent upon the walkway and shoe outsole materials, as well as the properties and thickness of the fluid contaminant layer. In the case of pure hydroplaning (i.e. $\tau_y = 0$) there is no interaction between the shoe outsole and the walkway surface, reducing equation (7) to:

$$\tau = \eta \dot{\gamma}, \qquad (8)$$

which can also be handled by the proposed model by setting $\tau_y = 0$, as will be demonstrated below.

Substituting equation (7) into equation (6) yields:

$$\frac{dp}{dx} = \eta \frac{\partial^2 V}{\partial y^2} \qquad (9)$$

It is noted for completeness that this is identical to the expression resulting for a thin hydrodynamic film of Newtonian fluid.

Shoe-Fluid-Walkway Interface

Figure 8:
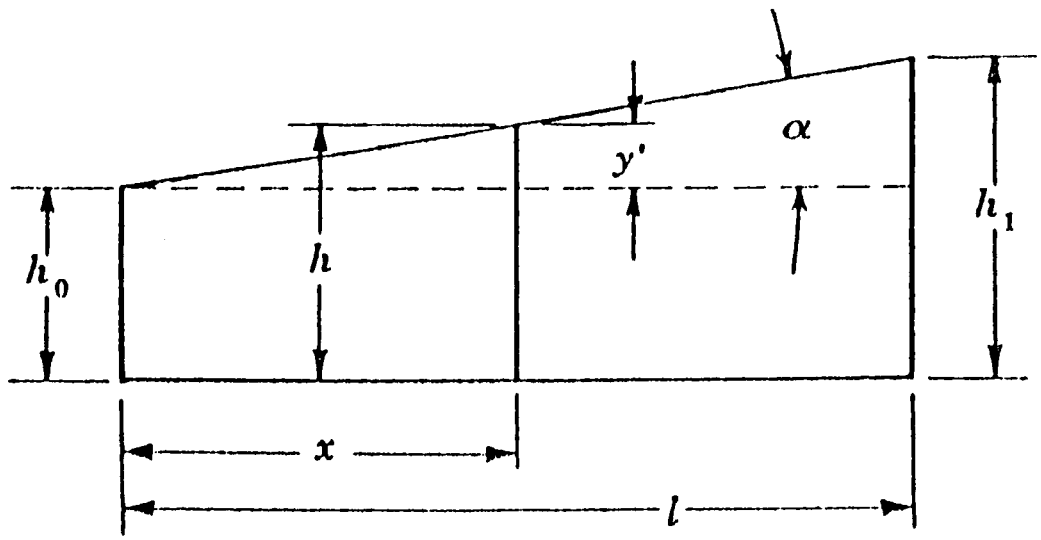
FIG. 8 depicts the shoe-fluid floor interface.
Figure 9A:
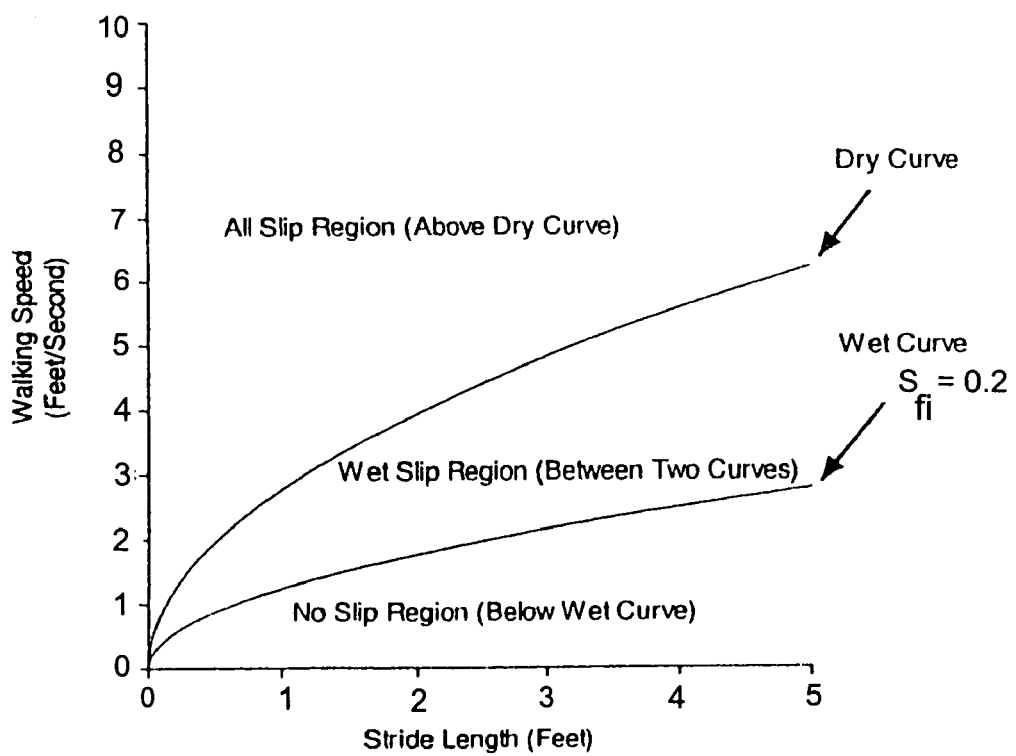
FIGS. 9a–d compare the likelihood of slip on the same walkway surface under both (varying degrees of) wet and dry conditions.
Figure 9B:
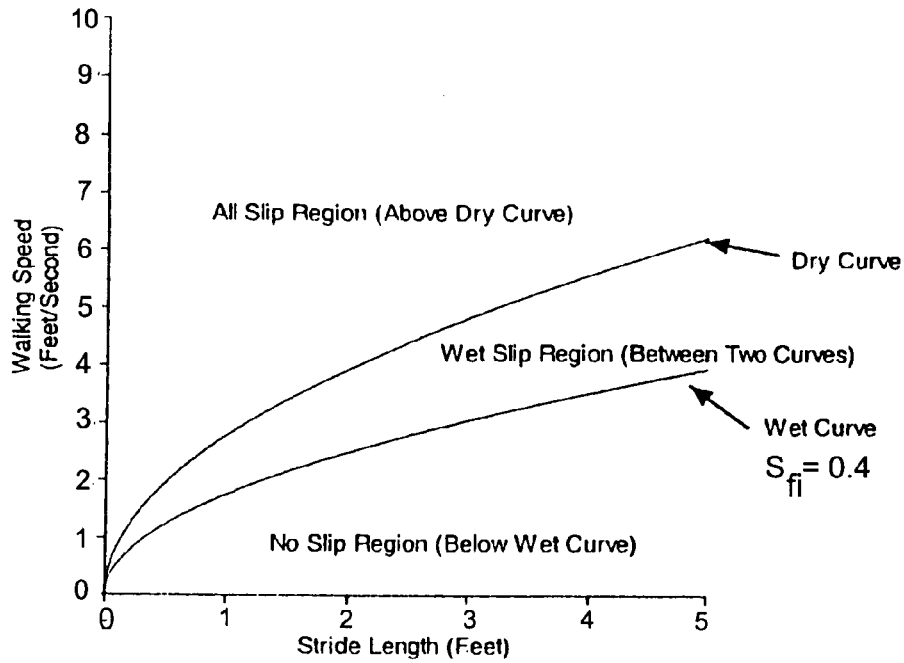
Figure 9C:
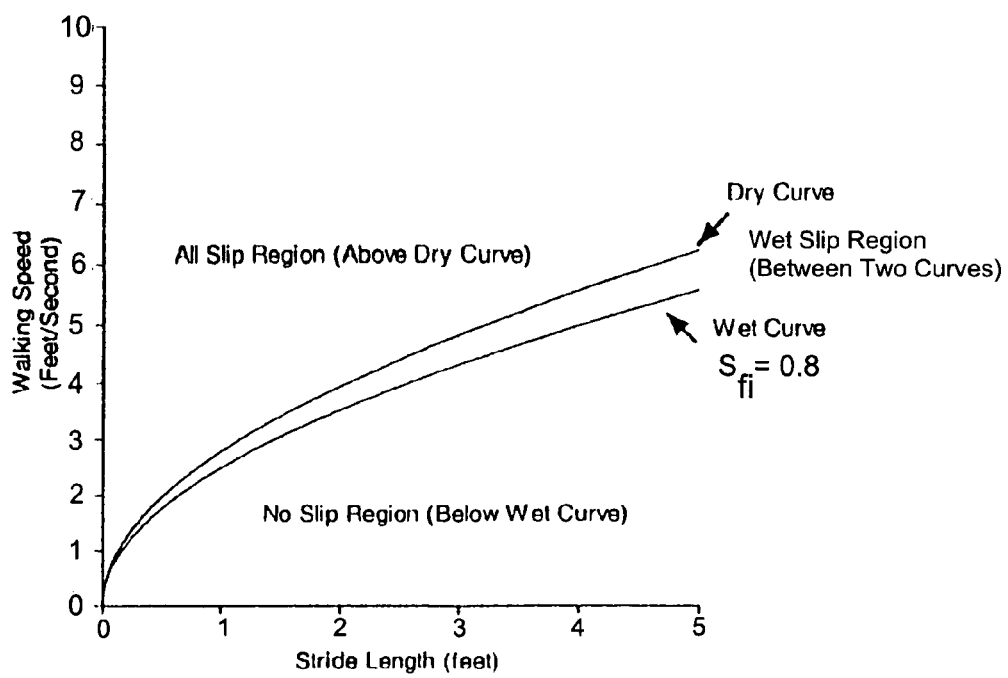
Figure 9D:
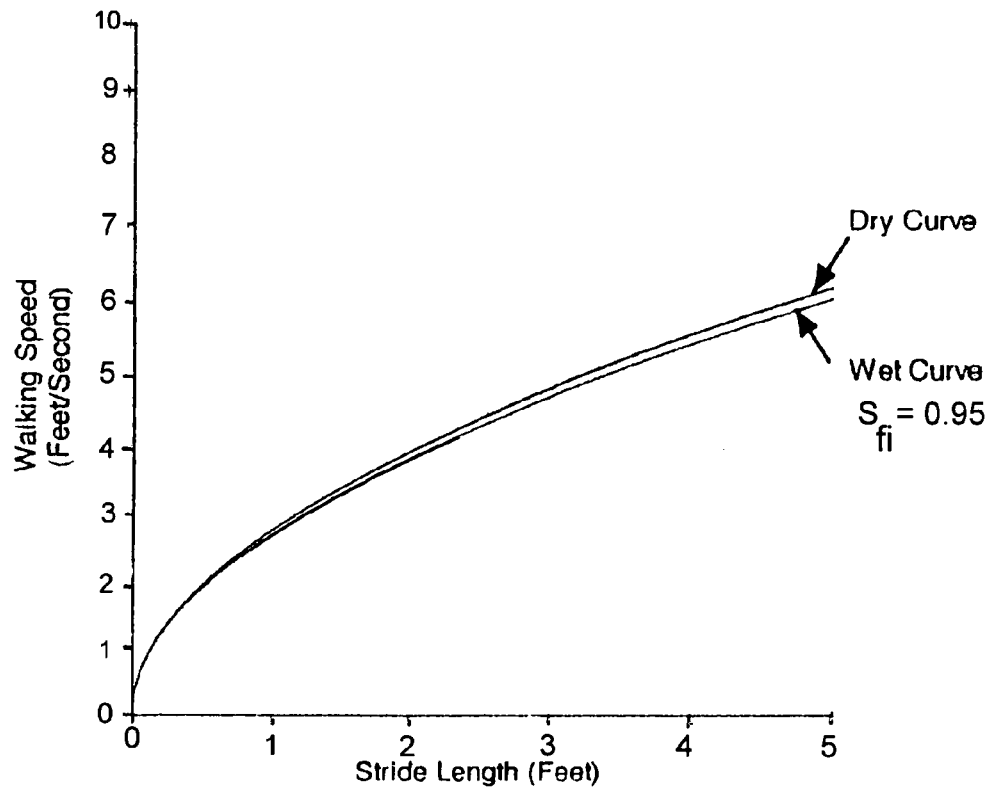

Following the development by D D Fuller, as described in *Theory And Practice Of Lubrication For Engineers*, John Wiley & Sons, Inc., 1984, for a stationary tapered wedge separated from a horizontal moving plate by a film of fluid lubricant, with the appropriate change in boundary conditions, the shoe in the instant case is modeled as a moving tapered wedge separated from a stationary horizontal floor by a thin fluid film (contaminant) of varying thickness h, as shown in the FIG. 8. The appropriate velocity (V) boundary conditions for the instant application become:

$$V = \dot{x} @ y = h$$

$$V = 0 @ y = 0 \qquad (10)$$

where, as before, V is the (horizontal) velocity through the fluid layer and $\dot{x}$ is the horizontal shoe (foot) speed at first contact with the fluid/walkway interface. Integrating equation (9) twice, and applying the boundary conditions in equations (10), the expression for the velocity profile through the fluid (contaminant) layer becomes:

$$V = \frac{1}{2\eta} \frac{dp}{dx} y^2 + \left[\frac{\dot{x}}{h} - \frac{h}{2\eta} \frac{dp}{dx}\right] y \qquad (11)$$

Development of the Wet Slip Criterion

As with the dry model, the slip criterion follows from a simple dimensional analysis. For slip on a hard, flat, wet, level surface the slip criterion takes the form:

$$F_\tau = \frac{C_{wi} M V_i^2}{L} \qquad (12)$$

where the terms in equation (12) are defined as follows:

$F_\tau$—Threshold friction (shear) force which defines the onset of macroslip;

$C_{wi}$—Experimentally determined dimensionless anthropometric constant ($AGI_{wet}$) analogous to $C_{di}$ ($AGI_{dry}$) in the dry model, i=k for slip at heel strike; and i=s for slip at push-off;

M—Mass of the individual;

$V_i$—Forward (horizontal) speed of the foot at first contact with the fluid/floor interface for i=k;

$V_i$—Forward (horizontal) speed of the center of mass of the individual for i=s; and L—Stride length.

Slip is predicted to occur when the maximum friction (shear) force defined by the right side of equation (12) is equal to (or greater than) the threshold friction force, $F_\tau$. For slip on a wet surface, the threshold friction force is a function of the properties of the fluid contaminant and the composite behavior of the shoe-fluid-floor interface. Utilizing equation (7) to define the threshold friction force, and substituting into equation (12), the equation defining the onset of slip (slip criterion) on a wet walkway surface becomes:

$$(\tau_y + \eta \dot{\gamma}) A_c = \frac{C_{wi} M V_i^2}{L}, \qquad (13)$$

where:

$\tau_y$—shear stress necessary to commence slip;

η—absolute viscosity of the fluid contaminant;

$\dot{\gamma}$—Velocity gradient ($\partial V/\partial y$), shear strain rate, through the fluid thickness; and $A_c$—Area of shoe contact with the interface at the commencement of macroslip.

For slip commencing at push-off, $\dot{\gamma} = 0$, at the commencement of push-off. The shoe (foot) commences slip from a zero forward velocity, and there is interpenetration and/or compliant interaction between the shoe outsole and walkway surface. For the purposes of the model of the present invention, at the commencement of slip at push-off the shoe and trapped fluid contaminant layer are considered to initially slip together relative to the walkway surface. Therefore, there is no velocity gradient through the fluid thickness and $\dot{\gamma} = 0$. $\tau_y A_c$ is the threshold friction force, $F_\tau$, and equation

(13) reduces to the same form as the dry criterion (equation 1) for slip at push-off. Therefore, for slip at push-off, it follows that, $C_{ws}=C_{ds}$.

Returning to the case of slip at heel strike and assuming that slip commences at the point of maximum pressure (dp/dx=0), equation (11) reduces to:

$$V = \frac{\dot{x}}{h^*} y \qquad (14)$$

where h* is the fluid (contaminant) depth at the point of maximum pressure. The velocity gradient ($\partial V/\partial y$) through the contaminant layer at the point of maximum pressure is, therefore, constant such that:

$$\frac{\partial V}{\partial y} = \frac{\dot{x}}{h^*} \qquad (15)$$

Substituting equation (15) into equation (13) and rearranging, the onset of wet slip commences when:

$$\eta = \frac{C_{wi} M h^* \dot{x}}{A_c L} - \frac{\tau_y h^*}{\dot{x}} \qquad (16)$$

Slip is, therefore, predicted to occur when:

$$\frac{C_{wi} M h^* \dot{x}}{A_c L} - \frac{\tau_y h^*}{\dot{x}} \geq \eta \qquad (16a)$$

Relationship Between $C_{wk}$ and $C_{dk}$

In order to obtain the relationship between $C_{dk}$ and $C_{wk}$, equation (13) is used to model a dry slip with ($\dot{\gamma}$) set equal to zero, i.e., the wet criterion is used to model a dry slip in the absence of a fluid film (contaminant) layer. Rearranging, equation (13) becomes:

$$\dot{x} = \sqrt{\left[\frac{\tau_y A_c L}{C_{wk} M}\right]} \qquad (17)$$

where $\tau_y A_c$ is the threshold friction force, $F_\tau$, and $\dot{x}$ is the horizontal foot speed at the moment of ground contact. Recall from dry slip (equation (1)) that the slip criteria under dry conditions is:

$$F_\tau = \frac{C_{di} M V^2}{L}, \qquad (18)$$

Rearranging equation (18) for the commencement of slip at heel strike, the dry criterion takes the form:

$$V = \sqrt{\left[\frac{F_\tau L}{C_{dk} M}\right]} \qquad (19)$$

Noting that the criterion as written in equation (17) is written in terms of the horizontal foot speed at ground contact, and that equations (18) and (19) are written in terms of the horizontal speed at the center of mass of the individual, the following generalized relationship is derived between $C_{dk}$ and $C_{wk}$, the dry and wet kinetic anthropometric constants, by equating the threshold friction forces, $F_\tau$, after rearranging equations (17) and (19).

$$\frac{\dot{x}^2}{V^2} = \frac{C_{dk}}{C_{wk}} \qquad (20)$$

Illustrative Example

To illustrate the utility of the wet criterion consider the following for slip at heel strike:

First, for the purposes of illustration, assume that during the gait cycle the leading leg fully extends prior to heel strike, and that the forward speed of the foot/shoe at heel strike assumes the same value as the forward speed of the individual's center of mass. It is noted that this may not generally be true, but is a reasonable simplifying assumption for the analysis which follows. Therefore, utilizing this simplifying assumption, from equation (20) it follows that:

$$C_{wk}=C_{dk} \qquad (21)$$

Consider a walkway surface/dry footwear combination with a kinetic coefficient of friction ($\mu_k$) equal to 0.5. Suppose a fluid contaminant (water, $\eta=2.09\times10^{-5}$ lb s/ft$^2$) is spilled onto walkway surface to a depth of 0.01 inches (8.33×10$^{-4}$ feet). Consider further, that a 165 lb (mass=5.12 Slugs) individual with a shoe heel contact patch of 1 in$^2$ (6.94×10$^{-3}$ ft$^2$) encounters a portion of the walkway surface with the fluid contaminant. Utilizing $C_{dk}=2.08$, as before (Part I), $C_{wk}$ is also equal to 2.08.

Rearranging equation (16), the wet slip criterion becomes:

$$\frac{C_{wk} M h^* \dot{x}^2}{A_c L} - \eta \dot{x} - \tau_y h^* = 0 \qquad (22)$$

which is a quadratic equation in terms of the forward foot speed ($\dot{x}$) at heel strike. Note again, that as a result of the aforementioned simplifying assumptions, the forward foot speed ($\dot{x}$) is equal to the forward (horizontal) speed of the center of mass of the individual at the moment of heel strike, i.e., $\dot{x}=V$. Therefore, equation (22) may be rewritten in terms of V, the walking speed at the center of mass as:

$$\frac{C_{wk} M h^* V^2}{A_c L} - \eta V - \tau_y h^* = 0 \qquad (23)$$

Recall that $\tau_y$ is the minimum shear stress required to initiate shear deformation in the fluid contaminant layer. $\tau_y$ arises as a result of the compliances and microtextures of both the walkway surface and the shoe outsole materials. Since neither the shoe outsole nor the walkway are mathematically smooth surfaces, in actuality, there will typically be interaction and interpenetration between the two surfaces, even in the presence of a fluid contaminant layer. We do note, however, that for $\tau_y=0$, i.e., no interaction or contact between the shoe outsole and walkway surface materials the phenomenon is one of pure hydroplaning, which the model can accommodate.

Although, there are numerous choices, the following form for $\tau_y$ is simple and captures the essential elements of the theory. The assumed form is $$\tau_y = S_{fi}\mu_i \frac{W}{A_c}, \qquad (24)$$

where:

$S_{fi}$—a measure of the surface-shoe interaction represented as a fraction of the coefficient of friction, ($\mu_i$);
W—weight of the individual; and
$A_c$—Contact area of the shoe (foot) with the walkway surface/fluid contaminant at the commencement of slip.

It is noted that $\tau_y$ can be defined in terms of either $\mu_s$ or $\mu_k$ as long as $S_{fi}$ is consistently defined. Discarding the extraneous root, equation (23) is now solved for V over a given range of walking speeds for various values of $S_{fi}$. It is noted that $S_{fi}$ will be dependent upon both the footwear and walkway surface textures, as well as the footwear tread pattern. The results are plotted in FIGS. 9a through 9d and compared to the results for the dry walkway, previously presented in FIG. 2. As expected, the addition of a thin fluid film on top of the walkway surface lowers the slip resistance. It is also noted that for $S_{fi}=1.0$, the predictions of the wet model reduce to those of the dry model, as expected, since $$\eta V \ll \frac{C_{wk}Mh^*V^2}{A_c L}.$$

Figure 10:
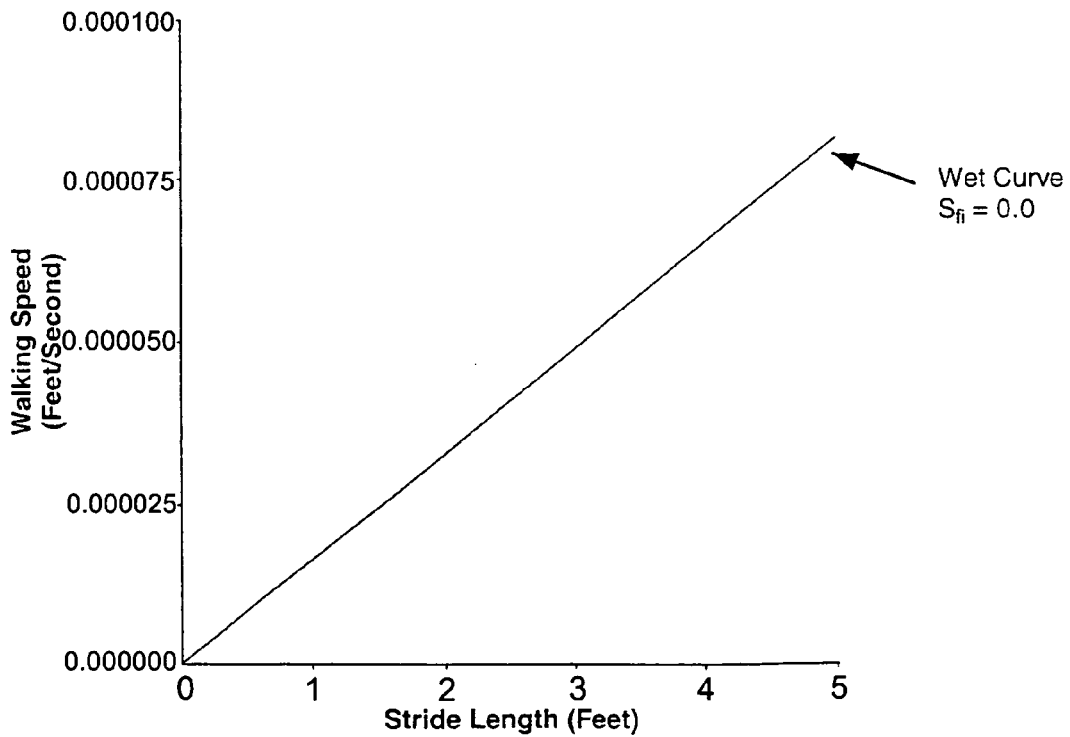
FIG. 10 demonstrates predictions of the method for the case of pure hydroplaning, i.e. for interaction of the shoe (foot) with the fluid layer absent any contact with the walkway surface.

See equation (23). For completeness, FIG. 10 illustrates the results for a pure hydroplaning situation ($\tau_y=0$). As expected, the model predicts that under these conditions, for all practical purposes, there is no slip resistance, and virtually any shoe (foot) motion causes a slip.

System

The present invention could be produced in hardware or software, or in a combination of hardware and software, and these implementations would be known to one of ordinary skill in the art. The system, or method, according to the inventive principles as disclosed, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as a local area network (LAN) as would be known to a person of ordinary skill in the art.

According to the inventive principles as disclosed, the invention and the inventive principles are not limited to any particular kind of computer system but may be used with any general purpose computer, as would be known to a person of ordinary skill in the art, arranged to perform the functions described and the method steps described herein. The operations of such a computer, as described above, may be according to a computer program contained on a medium for use in the operation or control of the computer, as would be known to person of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM or other optical memory storage devices, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

FIG. 11 is a block diagram of a computer system useful for implementing an embodiment of the present invention. The computer system includes one or more processors, such as processor 1104. The processor 1104 is connected to a communication infrastructure 1102 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1108 that forwards graphics, text, and other data from the communication infrastructure 1102 (or from a frame buffer not shown) for display on the display unit 1110. The computer system also includes a main memory 1106, preferably random access memory (RAM), and may also include a secondary memory 1112. The secondary memory 1112 may include, for example, a hard disk drive 1114 and/or a removable storage drive 1116, representing a floppy disk drive, a magnetic tape drive, an optical disk drive, etc. The removable storage drive 1116 reads from and/or writes to a removable storage unit 1118 in a manner well known to those having ordinary skill in the art. Removable storage unit 1118, represents a floppy disk, magnetic tape, optical disk, etc. which is read by and written to by removable storage drive 1116. As will be appreciated, the removable storage unit 1118 includes a computer usable storage medium having stored therein computer software and/or data.

In alternative embodiments, the secondary memory 1112 may include other similar means for allowing computer programs or other instructions to be loaded into the computer system. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to the computer system.

The computer system may also include a communications interface 1124. Communications interface 1124 allows software and data to be transferred between the computer system and external devices. Examples of communications interface 1124 may include a modem, a network interface (such as an Ethernet card), a communications port, a PCM-CIA slot and card, etc. Software and data transferred via communications interface 1124 are in the form of signals which may be, for example, electronic, electromagnetic, optical, or other signals capable of being received by communications interface 1124. These signals are provided to communications interface 1124 via a communications path (i.e., channel) 1126. This channel 1126 carries signals and may be implemented using wire or cable, fiber optics, a phone line, a cellular phone link, an RF link, and/or other communications channels.

As used herein, the terms "computer program medium," "computer usable medium," and "computer readable medium" are used to generally refer to media such as main memory 1106 and secondary memory 1112, removable storage drive 1116, a hard disk installed in hard disk drive 1114, and signals. These computer program products are means for providing software to the computer system. The computer readable medium allows the computer system to read data, instructions, messages or message packets, and other computer readable information from the computer readable medium. The computer readable medium, for example, may include non-volatile memory, such as floppy, ROM, flash memory, disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1106 and/or secondary memory 1112. Computer programs may also be received via communications interface 1124. Such computer programs, when executed, enable the computer system to perform the features of the present invention as discussed herein. In particular, the computer programs, when executed, enable the processor 1104 to perform the features of the computer system. Accordingly, such computer programs represent controllers of the computer system.

The present invention provides a system and method for predicting macroslip under both wet and dry walkway conditions on a level walkway surface. The present invention can easily be modified to include slip on a sloped (inclined) walkway surface. Parameters known to affect the likelihood of slip have been incorporated into a reasonably simple model for the prediction of macroslip.

The method of the present application has a multitude of practical applications related to, but not limited to, the insurance industry, footwear design and manufacturing industry, and the design and manufacture of flooring materials and floor treatment products. Representative non-limited examples are set forth below.

The insurance industry could apply the method of the present invention as a means in determining the premises liability of their insured clients. That is, the combination of flooring materials, footwear, environmental factors (i.e. wet vs. dry), intended use of the facility and the anthropometric characteristics of the user population can all be factored into an evaluation of the likelihood slip and fall occurrences and/or accidents, thereby, aiding in a determination of the risk of insuring certain clients.

In the footwear design and manufacturing industry, various shoe (outsole) designs and tread patterns can be evaluated for safety during the design phase by evaluating how safe the shoe is in terms of being able to prevent slip and fall accidents. This may be of special interest for manufacturers of special purpose footwear such as shoes to be worn in industrial or commercial settings where there is a high propensity towards slip and fall accidents. For example, slip and fall accidents are a concern in the food preparation and service industries, such as restaurants where kitchen floors often become slippery due to the presence of grease and other contaminants. Other examples include design of footwear for the elderly, who are at an increased risk for slip and fall accidents leading to injury and/or death.

Similarly, in the design and manufacture of flooring materials and floor treatment products it is clearly of paramount concern to be able to evaluate the safety of various flooring materials in terms of being able to assess the safety and performance of the floor against pedestrian slip under varying combinations of pedestrian traffic, footwear and environmental conditions. The method of the present invention could be used to determine the appropriate flooring materials to be used in almost any commercial, residential or industrial setting, and to aid in the determination and selection of the appropriate flooring material and/or treatment products.

All references cited herein are expressly incorporated by reference in their entirety.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. In addition, unless mention was made above to the contrary, it should be noted that all of the accompanying drawings are not to scale. Furthermore, it is intended that the appended claims cover any and all such applications, modifications, and embodiments within the scope of the present invention.

What is claimed:

1. A method for predicting a macroslip on a walkway surface, comprising:
    determining and storing with an electronic processor a characteristic of a shoe-walkway surface interface, including determining the characteristic of the shoe-walkway surface interface in a heel strike condition and in a push-off condition;
    determining and storing with the electronic processor an anthropometric constant, including determining the Anthropometric Gait Index (AGI), or indices, for specific anthropometric groupings;
    determining and storing with the electronic processor a relationship between a walking speed and a stride length at which macroslip occurs in terms of the characteristic of the shoe-walkway surface interface and the anthropometric constant; and
    providing as an output of the electronic processor a plot of a nonlinear curve of the relationship between the walking speed and stride length in terms of the characteristic of the shoe-walkway surface interface and the anthropometric constant for at least one of the specific anthropometric groupings, wherein the macroslip is predicted to occur at a position on or above the non-linear curve.

2. The method of claim 1, wherein each of the specific anthropometric groupings includes group members related by age, height, weight, specific gait peculiarities, and gender.

3. The method of claim 1, further comprising:
determining the walking speed and stride length for an individual at the commencement of macroslip; and
plotting the walking speed and stride length for the individual on the curve of the relationship between the walking speed and stride length of the anthropometric group, wherein the macroslip is predicted to occur at a position on or above the curve of the relationship between the walking speed and stride length.

4. The method of claim 1, wherein the characteristic of the shoe-walkway surface interface includes a dry walkway surface.

5. The method of claim 4, wherein the onset of macroslip occurs when $$\mu_i = \frac{C_{di}V^2}{gL},$$

wherein $\mu_i$ is a relevant coefficient of friction for the shoe-walkway surface interface, $C_{di}$ is the anthropometric constant (AGI) for the dry surface, V is a forward walking speed of a center of mass of an individual, L is the stride length of the individual, and g is an acceleration due to gravity.

6. The method of claim 5, wherein for determining macroslip at the push-off condition the relevant coefficient of friction $\mu_i$ is a static coefficient of friction and for determining macroslip at the heel strike condition the relevant coefficient of friction $\mu_i$ is a dynamic coefficient of friction.

7. The method of claim 5, wherein the anthropometric constant $C_{di}$ is determined from:

$$C_{di} = \frac{\mu_i gL}{V^2}.$$

8. The method of claim 5, wherein the anthropometric constant $C_{di}$ is experimentally determined.

9. The method of claim 5, wherein the relationship between the walking speed and stride length at the onset of macroslip is determined from:

$$V = \sqrt{\frac{\mu_i gL}{C_{di}}}.$$

10. A method for determining a slip on a dry walkway surface, comprising:
determining and storing with an electronic processor an anthropometric constant, $C_{di}$, for the dry walkway surface;
determining and storing with the electronic processor the occurrence of macroslip, wherein the macroslip occurs when $$\frac{C_{di}V^2}{gL} \geq \mu_i,$$

wherein V is a forward walking speed of a center of mass of an individual, L is a stride length of the individual, g is an acceleration due to gravity, and $\mu_i$ is a relevant coefficient of friction, wherein for determining macroslip at a push off condition the relevant coefficient of friction $\mu_i$ is a static coefficient of friction and for determining macroslip at a heel strike condition the relevant coefficient of friction $\mu_i$ is a dynamic coefficient of friction; and
determining and storing with the electronic processor a relationship between the forward walking speed and the stride length of the individual, wherein the relationship between the forward walking speed and stride length at which macroslip first occurs is determined from $$V = \sqrt{\frac{\mu_i gL}{C_{di}}};$$

and
providing as an output of the electronic processor a plot of a curve of the relationship between the forward walking speed and stride length, wherein the macroslip is predicted to occur at a position on or above the curve of the relationship between the forward walking speed and stride length.

11. A method for determining a slip on a wet walkway surface having a fluid contaminant thereon, comprising:
determining and storing with an electronic processor an anthropometric constant, $C_{wi}$, for the wet walkway surface;
determining and storing with the electronic processor the occurrence of slip, wherein the slip occurs when $$\frac{C_{wi}Mh^*\dot{x}}{A_c L} - \frac{\tau_y h^*}{\dot{x}} \geq \eta, \quad \text{for} \quad i = k$$

wherein M is a mass of an individual, h* is a depth of the fluid contaminant at a point of maximum pressure, $\dot{x}$ is a horizontal shoe (foot) speed, $\tau_y$ is a shear stress necessary to commence shearing in the fluid contaminant, $A_c$ is an area of shoe contact with the interface at the commencement of macroslip, L is a stride length of the individual, and $\eta$ is an absolute viscosity of the fluid contaminant.

12. The method of claim 11, further comprising:
determining and storing with the electronic processor a relationship between a forward walking speed and the stride length for the individual; wherein the horizontal shoe speed, $\dot{x}$, is equal to V, the forward walking speed at a center of mass of the individual at heel strike, and the relationship between the forward walking speed at a center of mass of the individual and stride length is determined from $$\frac{C_{wk}Mh^*V^2}{A_c L} - \eta V - \tau_y h^* = 0; \text{ and}$$

providing as an output of the electronic processor a plot of a curve of the relationship between the forward walking speed and stride length, wherein the slip is predicted to occur at a position on or above the curve of the relationship between the forward walking speed and stride length.

13. The method of claim 11, wherein $\tau_y$, is determined from:

$$\tau_y = S_{fi}\mu_i \frac{W}{A_c},$$

wherein $\mu_i$ is a relevant coefficient of friction, $S_{fi}$ is a measure of the walkway surface-footwear interaction represented as a fraction of the coefficient of friction, and W is a weight of the individual.

14. The method of claim 13, wherein for determining slip at push-off the relevant coefficient of friction $\mu_i$ is a static coefficient of friction.

15. The method of claim 13, wherein for determining slip at heel strike the relevant coefficient of friction $\mu_i$ is a dynamic coefficient of fiction.

16. The method of claim 11, wherein the anthropometric constant $C_{wk}$ for the wet surface is related to an anthropometric constant $C_{dk}$ for the dry surface and determined from $$C_{wk} = \frac{V^2}{\dot{x}^2} C_{dk}$$

wherein V is a forward walking speed at a center of mass of the individual.

17. The method of claim 11, wherein the anthropometric constant $c_{wi}$ is experimentally determined.

* * * * *

UNITED STATES PATENT AND TRADEMARK OFFICE
CERTIFICATE OF CORRECTION

PATENT NO.       : 7,089,151 B2
APPLICATION NO.  : 10/818921
DATED            : August 8, 2006
INVENTOR(S)      : S. Batterman and S. Batterman Page 1 of 1

It is certified that error appears in the above-identified patent and that said Letters Patent is hereby corrected as shown below:

Column 3, line 32
the phrase "FIG. 8 depicts the shoe-fluid floor interface."
should read --FIG. 8 depicts the shoe-fluid-floor interface.--

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,089,151 B2 |
| APPLICATION NO. | : 10/818921 |
| DATED | : August 8, 2006 |
| INVENTOR(S) | : S. Batterman and S. Batterman |

It is certified that error appears in the above-identified patent and that said Letters Patent is hereby corrected as shown below:

In the Figures
FIG. 11 was missing from the issued patent. Accordingly, Registrant requests that FIG. 11 be inserted into the patent. A copy of FIG. 11 is attached below.

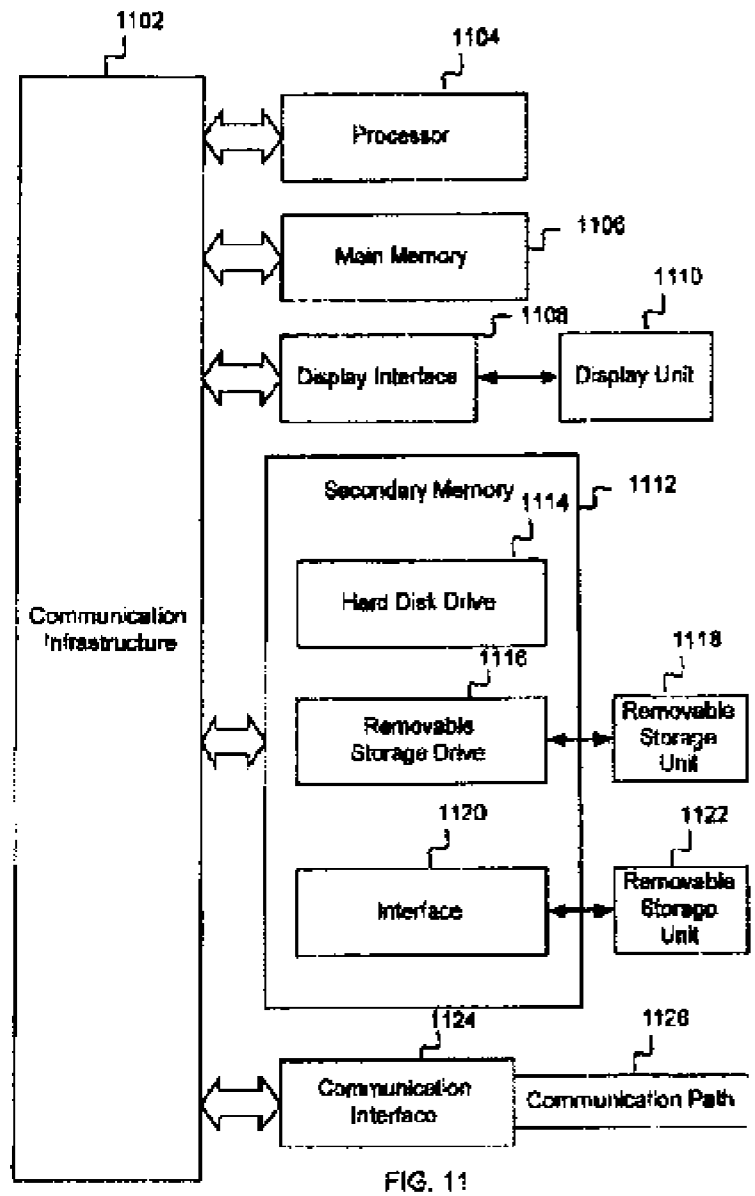

FIG. 11

UNITED STATES PATENT AND TRADEMARK OFFICE
CERTIFICATE OF CORRECTION

PATENT NO.        : 7,089,151 B2
APPLICATION NO. : 10/818921
DATED             : August 8, 2006
INVENTOR(S)       : S. Batterman and S. Batterman It is certified that error appears in the above-identified patent and that said Letters Patent is hereby corrected as shown below:

Column 3, line 32
the phrase "FIG. 8 depicts the shoe-fluid floor interface."
should read --FIG. 8 depicts the shoe-fluid-floor interface.--

Column 7, Table 1 should read

TABLE 1

| | no. steps | seconds leg length 39" | seconds leg length 50" | mph | fps walk | 1/2 step" male | step angle° | min cof to prevent slips | $C_{dk}$ |
|---|---|---|---|---|---|---|---|---|---|
| v. slow | 23.0 | 15.5 | — | 2.2 | 3.2 | 26.1 | 13.1 | 19.5 | 0.35 | 2.40 |
| slow    | 20.5 | 13.7 | — | 2.4 | 3.6 | 29.3 | 14.6 | 22.0 | 0.40 | 2.42 |
| reg.    | 18.6 | 11.9 | — | 2.9 | 4.2 | 32.3 | 16.1 | 24.4 | 0.45 | 2.20 |
| brisk   | 18.2 | 10.8 | — | 3.1 | 4.6 | 33.0 | 16.5 | 25.0 | 0.47 | 1.97 |
| fast    | 17.5 | 9.4  | — | 3.6 | 5.3 | 34.3 | 17.1 | 26.0 | 0.49 | 1.61 |
| faster  | 17.0 | 8.3  | — | 4.1 | 6.0 | 35.3 | 17.6 | 26.8 | 0.51 | 1.34 |
| v. fast | ·15.3 | 6.6 | — | 5.2 | 7.6 | 39.2 | 19.5 | 30.2 | 0.58 | 1.06 |
|         | —    | —    | — | —   | —   | —    | —    | —    | —    | —    |
| slow    | 19.5 | 12.6 | — | 2.7 | 4.0 | 30.7 | 15.4 | 23.2 | 0.43 | 2.22 |
| med.    | 18.6 | 10.5 | — | 3.2 | 4.8 | 32.3 | 16.1 | 24.5 | 0.46 | 1.73 |
| brisk   | 16.0 | 9.0  | — | 3.8 | 5.6 | 37.6 | 18.8 | 28.9 | 0.55 | 1.77 |
| fast    | 15.0 | 8.0  | — | 4.3 | 6.3 | 40.0 | 20.0 | 30.9 | 0.60 | 1.62 |

UNITED STATES PATENT AND TRADEMARK OFFICE
CERTIFICATE OF CORRECTION

PATENT NO. : 7,089,151 B2
APPLICATION NO. : 10/818921
DATED : August 8, 2006
INVENTOR(S) : S. Batterman and S. Batterman It is certified that error appears in the above-identified patent and that said Letters Patent is hereby corrected as shown below:

Column 8, line 7
the phrase "representative. $C_{dk}$ (the average, for example) to be taken as constant"
should read --representative $C_{dk}$ (the average, for example) to be taken as constant--

Column 9, line 14
equation (7) "$\tau = \tau_y + \eta y$"
should read --$\tau = \tau_y + \eta y$ --

Column 9, line 21
the phrase "$y$ is the shear strain rate"
should read -- $y$ is the shear strain rate--

Column 9, line 35
equation (8) "$\tau = \eta y$"
should read --$\tau = \eta y$,--

Claim 15, Column 20, line 2
the phrase "dynamic coefficient of fiction."
should read --dynamic coefficient of friction.--

Claim 17, Column 20, line 18
the phrase "constant $c_{wi}$ is experimentally determined."
should read --constant $C_{wi}$ is experimentally determined.--

This certificate supersedes Certificate of Correction issued March 6, 2007.

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,089,151 B2 |
| APPLICATION NO. | : 10/818921 |
| DATED | : August 8, 2006 |
| INVENTOR(S) | : S. Batterman and S. Batterman |

It is certified that error appears in the above-identified patent and that said Letters Patent is hereby corrected as shown below:

In the Figures
FIG. 11 was missing from the issued patent. Accordingly, Registrant requests that FIG. 11 be inserted into the patent. A copy of FIG. 11 is attached below.

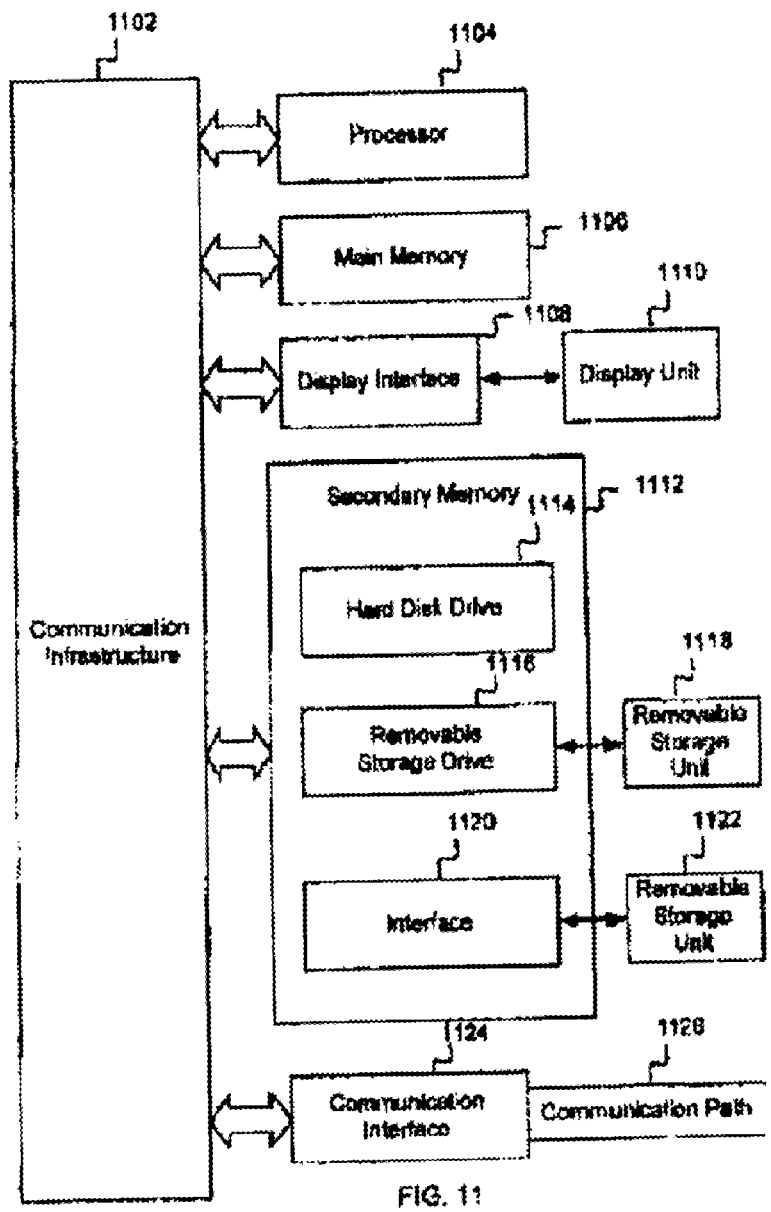

FIG. 11

UNITED STATES PATENT AND TRADEMARK OFFICE
CERTIFICATE OF CORRECTION

PATENT NO.         : 7,089,151 B2
APPLICATION NO. : 10/818921
DATED                 : August 8, 2006
INVENTOR(S)       : S. Batterman and S. Batterman It is certified that error appears in the above-identified patent and that said Letters Patent is hereby corrected as shown below:

Column 3, line 32
the phrase "FIG. 8 depicts the shoe-fluid floor interface."
should read -- FIG. 8 depicts the shoe-fluid-floor interface. --

Column 7, Table 1 should read

TABLE 1

|  | no. steps | seconds leg length 39" | mph 50' | fps walk | 1/2 step" male | step angle° | min cof to prevent slips | $C_{dk}$ |
|---|---|---|---|---|---|---|---|---|
| v. slow | 23.0 | 15.5 | 2.2 | 3.2 | 26.1 | 13.1 | 19.5 | 0.35 | 2.40 |
| slow | 20.5 | 13.7 | 2.4 | 3.6 | 29.3 | 14.6 | 22.0 | 0.40 | 2.42 |
| reg. | 18.6 | 11.9 | 2.9 | 4.2 | 32.3 | 16.1 | 24.4 | 0.45 | 2.20 |
| brisk | 18.2 | 10.8 | 3.1 | 4.6 | 33.0 | 16.5 | 25.0 | 0.47 | 1.97 |
| fast | 17.5 | 9.4 | 3.6 | 5.3 | 34.3 | 17.1 | 26.0 | 0.49 | 1.61 |
| faster | 17.0 | 8.3 | 4.1 | 6.0 | 35.3 | 17.6 | 26.8 | 0.51 | 1.34 |
| v. fast | -15.3 | 6.6 | 5.2 | 7.6 | 39.2 | 19.5 | 30.2 | 0.58 | 1.06 |
| slow | 19.5 | 12.6 | 2.7 | 4.0 | 30.7 | 15.4 | 23.2 | 0.43 | 2.22 |
| med. | 18.6 | 10.5 | 3.2 | 4.8 | 32.3 | 16.1 | 24.5 | 0.46 | 1.73 |
| brisk | 16.0 | 9.0 | 3.8 | 5.6 | 37.6 | 18.8 | 28.9 | 0.55 | 1.77 |
| fast | 15.0 | 8.0 | 4.3 | 6.3 | 40.0 | 20.0 | 30.9 | 0.60 | 1.62 |

UNITED STATES PATENT AND TRADEMARK OFFICE
CERTIFICATE OF CORRECTION

PATENT NO. : 7,089,151 B2
APPLICATION NO. : 10/818921
DATED : August 8, 2006
INVENTOR(S) : S. Batterman and S. Batterman It is certified that error appears in the above-identified patent and that said Letters Patent is hereby corrected as shown below:

Column 8, line 7
the phrase "representative. $C_{dk}$ (the average, for example) to be taken as constant"
should read -- representative $C_{dk}$ (the average, for example) to be taken as constant --

Column 9, line 14
equation (7) "$\tau = \tau_y + \eta \gamma$"
should read -- $\tau = \tau_y + \eta \dot{\gamma}$ --

Column 9, line 21
the phrase "y is the shear strain rate"
should read -- $\dot{\gamma}$ is the shear strain rate --

Column 9, line 35
equation (8) "$\tau = \eta \gamma$"
should read -- $\tau = \eta \dot{\gamma}$, --

Claim 15, Column 20, line 2
the phrase "dynamic coefficient of fiction."
should read -- dynamic coefficient of friction. --

Claim 17, Column 20, line 18
the phrase "constant $c_{wi}$ is experimentally determined."
should read -- constant $C_{wi}$ is experimentally determined. --

This certificate supersedes the Certificates of Correction issued March 6, 2007 and July 31, 2007.

Signed and Sealed this

Thirteenth Day of May, 2008

JON W. DUDAS
*Director of the United States Patent and Trademark Office*